United States Patent
Vanmaele et al.

(10) Patent No.: US 7,288,679 B2
(45) Date of Patent: Oct. 30, 2007

(54) DEVICE PROVIDED WITH A DEDICATED DYE COMPOUND

(75) Inventors: Luc Vanmaele, Lochristi (BE); Paul Leblans, Kontich (BE); Luc Struye, Mortsel (BE)

(73) Assignee: AGFA-Gevaert, Mortsel (BE)

( * ) Notice: Subject to any disclaimer, the term of this patent is extended or adjusted under 35 U.S.C. 154(b) by 369 days.

(21) Appl. No.: 10/913,010

(22) Filed: Aug. 6, 2004

(65) Prior Publication Data

US 2006/0030738 A1 Feb. 9, 2006

(51) Int. Cl.
*C07F 9/02* (2006.01)
(52) U.S. Cl. .......................... 568/9; 359/197
(58) Field of Classification Search .............. 568/9; 359/197
See application file for complete search history.

(56) References Cited

U.S. PATENT DOCUMENTS 4,770,984 A 9/1988 Ailliet et al. ............... 430/505

FOREIGN PATENT DOCUMENTS

| DE | 195 42 239 | 11/1995 |
|---|---|---|
| EP | 0 696 758 | 2/1996 |

OTHER PUBLICATIONS

Sundheim et al., {Charge transfer to solvent (CTTS) spectrum of bromide ion in molten tetrabutylphosohonium tetrabromometalates, Applied Spectroscopy (1973), 27(5), 394}.*

* cited by examiner

*Primary Examiner*—Thurman K. Page
*Assistant Examiner*—Chukwuma Nwaonicha
(74) *Attorney, Agent, or Firm*—Joseph T. Guy; Nexsen Pruet, LLC

(57) ABSTRACT

A device comprises at least one organophosphonium transition metal dye or is provided with a filter, comprising at least one organophosphonium transition metal dye, wherein, in a particular embodiment said device is selected from the group consisting of a scanner, a digitizer, a display and a photographic device.

20 Claims, 1 Drawing Sheet

DEVICE PROVIDED WITH A DEDICATED DYE COMPOUND

FIELD OF THE INVENTION

The present invention relates to dye-based filters for use in diverse applications as display technology, optical equipment and diagnostic systems as e.g. diagnostic systems for reading out stimulable phosphor screens as image-wise X-ray detecting systems, systems for processing analog and digital signals, sensitive to different wavelength ranges, requiring filtering of said signals as in analog and digital image formation systems, and other lighting systems requiring attenuation or accentuation of particular types of electromagnetic radiation.

BACKGROUND OF THE INVENTION

Quite a lot of applications make use of suitable dye-based filters or of dyes, present in layers of materials or in subjects wherein well-defined wavelength ranges of irradiating sources should be blocked or selectively transmitted. So in the following fields it is recognized that dyes are crucial in order to fully provide advantage of their characteristic properties.

One particular filter application is related with displays and other equipment utilized in military, sports, transportation activities, whether or not in combination with night vision equipment. Displays and equipment conventionally utilize a filter to accomodate the night vision equipment as in aviation applications, wherein color displays are used with night vision imaging systems. Such displays provide visual information to captains, pilots, drivers and operators of ships, aircraft and vehicles and the viewer of color display often wears goggles at the same time while information from the color display is observed. Typically such goggles are sensitive to light between 425 nm and 1000 nm. So at 600 nm the sensitivity rapidly increases and reaches a peak at 760 nm in order to see objects which cannot ordinarily be seen by the naked eye. Compatibility problems with cockpit displays may however arise and are more particularly related with contrast reduction. This may lead to limited viewability and impaired object recognition as fine details cannot be observed. Conventional avionic displays designed to be used with night vision imaging systems are moreover generally restricted to narrow emission, such as single color displays (e.g. green colored displays). It is clear that interference with night vision imaging systems should be avoided. Difficulties are further related with highlighting and differentiating large amounts of information if the display is restricted to one single color. In another conventional avionic system color displays include a night vision imaging system filter, wherein the color display operates in a low luminance night vision mode and a daylight mode. A filter such as a liquid crystal display is provided therefore between the light source and an optical shutter. In daylight mode the displays use a second light source to provide light directly through the optical shutter without traversing the filter, so that the second light source is positioned so that its light is not provided through the night vision imaging system filter. Conventional filters are generally comprised of glass or other material supplemented by thin dielectric film coatings that attenuate infrared emissions or transmissions: thin multilayer dielectric films are typically used in order to provide a sharp cutoff, starting between 600 nm and 630 nm and additionally an absorptive substrate is used to attenuate longer wavelength emissions. In another attempt to attenuate such radiation, flexible emissive displays such as organic light-emitting diodes (OLEDs) are developed, but manufacturing is difficult. Furtheron thin film dielectric stacks are reflective in high ambient or daytime lighting and thereby reduce the contrast ration of the display. So a conventional thin film night vision imaging system filter may reflect as much as 50% of the light that strikes it at 630 nm wavelength.

In another application field such as in the field of color photographic applications, filter dyes are used as described e.g. in DE-A 19542239, in EP-A 0 696 758 and in U.S. Pat. No. 4,770,984. Important therein are filters used during film exposure, while taking photographs (e.g. in order to filter ultraviolet rays) as well as while exposing the negative image, thus providing color corrections in order to provide the most natural colors for the ultimate print as delivered to the customer. Analog as well as digital signals, sensitive in different wavelength ranges are envisaged therein and require filtering of undesired side-absorptions.

In another application field a diagnostic imaging system for reading out stimulable phosphor screens, plates or panels advantageously makes use of dye-based filters as (red) stimulating radiation should be unambiguously separated from light emitted upon stimulation of energy stored therein after exposure to X-ray energy in medical imagang systems (diagnostic imaging such as e.g. mammography, chest imaging, non-destructive testing applications, in portal and verification radiographic oncology systems and the like) as an array of e.g. transducer elements arranged for detecting said light emitted upon stimulation and for converting said light into a signal representation of said image should not be hit by stimulation radiation. Filtering means for preventing light emitted by said source of stimulation light from being detected by said transducer elements should, in other words, be characterized in that a ratio of transmission at the stimulating emission wavelength of said source of stimulation light in the wavelength range from 500 nm to about 850 nm and transmission of stimulated light in the wavelength range between 300 nm and 500 nm is as low as possible. This is particularly important when the detector is a CCD array having the highest quantum efficiency in the red region. The stimulation light can only be filtered away in an efficient way when the wavelength of the light emitted upon stimulation is quite different from the green or red stimulation light, i.e., that there is no or a only negligible overlap between the stimulation radiation spectrum and the stimulated emission radiation spectrum. In favor of customer-friendly handling or manutention in a medical radiographic environment, wherein a lot of phosphor plates or panels are exposed and read-out (processed) one after another, even if processed in a random order, it is recommended that detection of the blue light, emitted after photostimulation, proceeds with filters transmitting blue light for all screens or panels, without the need to change filters inbetween consecutive readings. For practical reasons it would thus be desirable to make use of only one, same filter for all of the different plates scanned in one, same scanning unit, in applications requiring an optimized image quality as well as in applications requiring ordinary image quality, and, more particularly in favor of cost reduction. Use of only one scanner would thus be highly appreciated for different types of plates.

OBJECTS AND SUMMARY OF THE INVENTION

Therefore, it is a first object of the present invention to provide highly efficient dye-based filters, suitable for use in diverse application fields as e.g. display technology, diagnostic systems, optical equipment, photographic materials and other lighting systems to attenuate or accentuate particular types of electromagnetic radiation.

In particular it is an object of the present invention to provide particular filters for use in displays and other equipment used in military, sports and transportation activities, often employed in combination with night vision equipment, as e.g. with reference to aviation applications.

More in particular it is an object of the present invention to provide particular filters for use in certain color aviation displays utilized with night vision imaging systems, such as those providing visual information to captains, pilots, drivers and operators of ships, aircraft, and vehicles, wherein the viewer of such a color display often wears goggles at the same time while observing the display.

It is a further object of the present invention to provide night vision imaging systems in ambient lighting and displays, wherein inexpensive filters having relatively precise and stable cutoff frequency, more particularly for use in avionic displays.

It is still a further object of the present invention to provide dual mode displays which do not require the complexity associated with wave-guides, and further not to require additional space about the perimeter of the display.

It is another specific object to provide a composition for a filter material in a read-out system in X-ray diagnostic imaging equipment, e.g. for a plurality of X-ray exposed storage phosphor panels, used for distinct radiological applications, wherein said panels are randomly exposed and processed one after another. More particularly, it is an object to make use of only one and the same scanning unit, in applications requiring optimum image quality as well as in applications requiring ordinary image quality, thereby reducing costs.

It is still another specific object to provide a particular dye suitable for use in particular applications of photosensitive materials.

Common envisaged properties for the dye-based filters of the present invention in all of the applications as envisaged are a low cost, a compact design and lack of suffering from perfomance losses.

Further advantages and embodiments of the present invention will become apparent from the following description and from the claims.

DETAILED DESCRIPTION OF THE INVENTION

Figure 1A:
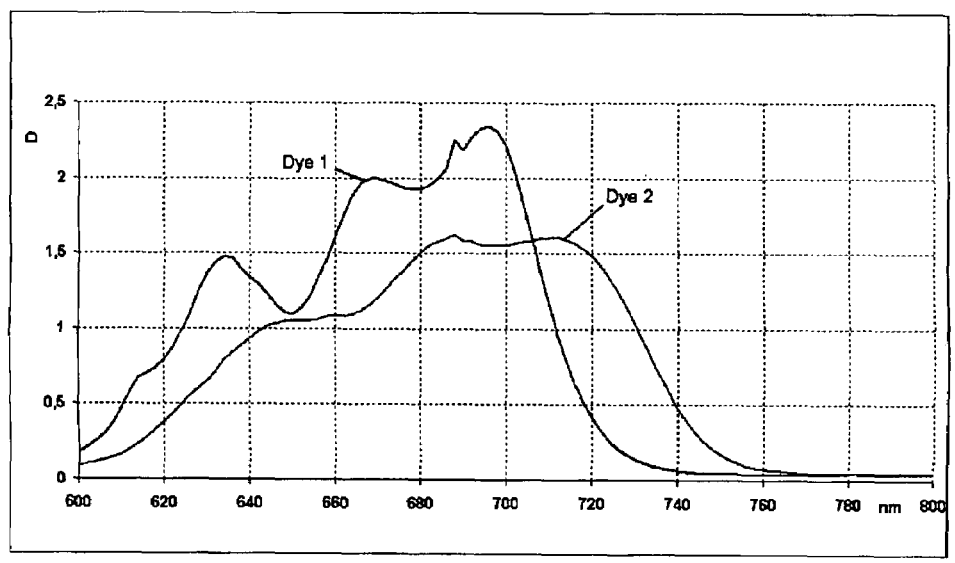
FIGS. 1A and 1B show the Absorption Spectrum and Transmission Spectrum of Dye 1 and of Dye 2, present as a thin film between two glass slides.

It has been found to be advantageous that, according to the present invention, a device comprises at least one organophosphonium transition metal dye.

In a particular embodiment thereof a device according to the present invention itself comprises a filter or filter layer, provided with at least one organophosphonium divalent transition metal dye.

The device is thus provided with the particular dye or dyes as such, and/or the said dye or dyes are present in a filter material, as a part of that device. In the further description of the embodiments, it is clear that when the device is mentioned, it is understood that a filter or filter layer as a part of such a device is also comprised.

In a preferred embodiment a device comprises, thus, as such or in a filter or filter layer thereof, an organophosphonium transition metal dye, wherein said transition metal in said organophosphonium transition metal dye is divalent cobalt or nickel.

According to the present invention a device is, more particularly, provided with an organophosphonium dye or compound according to the general formula (I)

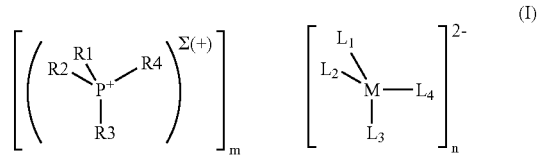

wherein M is Co or Ni,
wherein $n \geq 1$, $m \geq 1$, $\Sigma(+) \geq 1$,
wherein $-2n = m\Sigma(+)$,
wherein X=N or P,
wherein $R^1$, $R^2$, $R^3$ and $R^4$ are the same or different and each independently represents a (substituted or unsubstituted, saturated or unsaturated) alkyl group, a (substituted or unsubstituted, saturated or unsaturated) aliphatic group, a (substituted or unsubstituted) alicyclic hydrocarbon group, a (substituted or unsubstituted) aromatic group, a (substituted or unsubstituted) heteroaromatic group, a (substituted or unsubstituted) hyperbranched polymer group, a (substituted or unsubstituted) dendrimeric group or $R^1$, $R^2$, $R^3$ and $R^4$ each independently represents the necessary atoms to form a ring system with one another, and
wherein $L^1$, $L^2$, $L^3$ and $L^4$ each independently represents one of F, Cl, Br and I, and
when m=1, then $\Sigma(+)=2n$ and consequently 2n positively charged centers are present in the cation, and
when n=1 and $\Sigma(+)=1$, then m=2 and consequently two cations $(P^+R^1R^2R^3R^4)$ and $(P^+R^5R^6R^7R^8)$ are present in the molecule,
wherein $R^5$, $R^6$, $R^7$, $R^8$ are the same or different and each independently represents a (substituted or unsubstituted, saturated or unsaturated) alkyl group, a (substituted or unsubstituted, saturated or unsaturated) aliphatic group, a (substituted or unsubstituted) alicyclic hydrocarbon group, a (substituted or unsubstituted) aromatic group, a (substituted or unsubstituted) heteroaromatic group, a (substituted or unsubstituted) hyperbranched polymer group, a (substituted or unsubstituted) dendrimeric group or $R^5$, $R^6$, $R^7$ and $R^8$ each independently represents the necessary atoms to form a ring system with one another.

The term "alkyl" as used in disclosing the present invention means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethylpropyl, 2,2-dimethylpropyl and 2-methyl-butyl, without being limited thereto.

The term "saturated aliphatic group" as used in disclosing the present invention means saturated straight chain, branched chain and alicyclic hydrocarbon groups.

The term "unsaturated aliphatic group" as used in disclosing the present invention means straight chain, branched chain and alicyclic hydrocarbon groups which contain at least one double or triple bond.

The term "aromatic group" as used in disclosing the present invention means a covalently bound assemblage of cyclic conjugated carbon atoms, which are characterized by large resonance energies, e.g. benzene, naphthalene and anthracene.

The term "alicyclic hydrocarbon group" means a covalently bound assemblage of cyclic conjugated carbon atoms, which do not form an aromatic group, e.g. cyclohexane.

The term "substituted" as used in disclosing this invention means that one or more of the carbon atoms and/or that a hydrogen atom of one or more of the carbon atoms in an aliphatic group, an aromatic group or an alicyclic hydrocarbon group, are replaced by an oxygen atom, a nitrogen atom, a phosphorus atom, a silicon atom, a sulfur atom, a selenium atom or a tellurium atom, or a group containing one or more of these said carbon and hydrogen replacing atoms. Such substituents include hydroxyl groups, thiol groups, carbamate groups, urea groups, ether groups, thioether groups, nitrile groups, ketones, carboxylic acid groups, ester groups, sulphonate groups, sulphonamide groups, phosphonate groups, phosphonamide groups, phosphonamidate groups, amide groups, amine groups, ammonium groups, sulphonium groups and phosphonium groups.

The terms "ammonium group", "sulphonium group" and "phosphonium group" respectively mean a positively charged nitrogen, sulphur and phosphor atom.

The term "heteroaromatic group" means an aromatic group wherein at least one of the cyclic conjugated carbon atoms is replaced by a nitrogen atom or a phosphorus atom.

The term "heterocyclic group" means an alicyclic hydrocarbon group wherein at least one of the cyclic conjugated carbon atoms is replaced by an oxygen atom, a nitrogen atom, a phosphorus atom, a silicon atom, a sulfur atom, a selenium atom or a tellurium atom.

The term "$\Sigma(+)$" means the sum of the positive charges in the cation.

The term "dendrimeric group" and the term "hyperbranched polymer group" have the meaning as described in the following literature references (a) C. Gao, D. Yan, Progress in Polymer Science 29 (2004), 183-275, (b) Topics in Current Chemsitry Volumes 197, 210, 211 and 217, (c) Jikei, M.; Kakimoto, M. Prog. Polym. Sci. 2001, 26, 1233, (d) Newkome, G. R.; Moorefield, C. N.; Vögtle, F. Dendritic Molecules:Concepts, Synthesis, Perspectives; VCH: Weinheim, 2001, (e) Kim, Y. H. J. Polym. Sci., Polym. Chem. Ed. 1998, 36, 1685, (f) Voit, B. I. J. Polym. Sci., Polym. Chem. 2000, 38, 2505, (g) Sunder, A.; Heinemann, J.; Frey, H. Chem. Eur. J. 2000, 6, 2499. From these reviews, it is obvious that hyperbranched polymers must be clearly distinguished from the regularly branched dendrimers.

The term "transition metal dye" means a compound with an absorption in the visual and/or infrared part of the spectrum and which contains both a transition metal ion and organic counterions. The term "divalent transition metal" refers to the valency of the the central coordination metal, which is in the divalent state.

A device according to the present invention, in a particular embodiment is a layered material, wherein in at least one layer thereof at least one organophosphonium transition metal dye is present according to the general formula (I) as presented hereinbefore.

In one embodiment a device according to the present invention thus comprises an organophosphonium dye according to the general formula (I) in a pure, dye-based form. In a particular embodiment thereof a device according to the present invention said organophosphonium dye is present as a viscous deep blue oil. It is advantageous that, according to the present invention, said viscous deep blue oil is applied between colored or non-colored glass plates or plastic foils. In another embodiment according to the present invention, said viscous deep blue oil is embedded in a polymer host. Said polymer host is, in a further embodiment, present in a UV-cured or thermally cured matrix. In still another embodiment of the present invention said viscous deep blue oil is coated from a solvent-based coating solution and is thus present in a solvent-based coating. In that case said viscous deep blue oil is preferably coated from a concentrated solvent-based coating solution, provided with the common additives known by anyone skilled in the art, like e.g. light stabilizers, viscosity modifiers and preservation agents, like anti-oxidants and biocides, without however being limited thereto. In a particular embodiment one of said additives is a binder medium. The solvent used in a solvent-based coated layer is further advantageously removed from the matrix by evaporation.

In the embodiment of a UV-cured matrix, according to the present invention, a UV-cured matrix generated from a UV-curable composition comprising monomers, oligomers or mixtures thereof, photoinitiators and/or synergists, is advantageously used.

Photoinitiators suitable for use in UV-curing can be taken from the teachings in "Surface Coatings Technology" Volume III, 1998, "Photoinitiators for Free Radical Cationic & Anionic Photopolymerisation", 2nd Edition, from Crivello & Dietliker, Edited by G. Bradley, John Wiley and Sons, more in particular described on the pages 208-224.

Any polymerizable compound commonly known in the art may be employed. Particularly preferred for use as a radiation-curable compound in the radiation curable composition, are monofunctional and/or polyfunctional acrylate monomers, monofunctional and/or polyfunctional methacrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylates such as described in U.S. Pat. No. 6,310,115, 2-(vinyloxy)ethylacrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, caprolactam modified dipentaerythritol hexaacrylate, N-vinylamide such as N-vinylcaprolactam or N-vinylformamide; or acrylamide or a substituted acrylamide such as acryloylmorpholine; and amino functionalized polyetheracrylates such as described in U.S. Pat. No. 6,300,388; methyl methacrylate, ethyl methacrylate, butyl methacrylate, methoxypolyethylene glycol methacrylate, methoxytriethylene glycol methacrylate, 4-(vinyloxy)butylmethacrylate, vinyl ether acrylate such as described in U.S. Pat. No. 6,310,115, hydroxyethyl methacrylate, phenoxyethyl methacrylate, cyclohexyl methacrylate, tetraethylene glycol dimethacrylate, and polyethylene glycol dimethacrylate.

Examples of the above mentioned polymerizable oligomers include epoxy acrylates, aliphatic urethane acrylates, aromatic urethane acrylates, polyester acrylates, and straight-chained acrylic oligomers, without however being limited thereto.

According to the present invention said viscous oil, said polymer host and/or said solvent-based coating layer further comprises a compound according to the formula

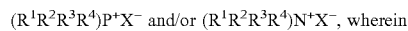

$(R^1R^2R^3R^4)P^+X^-$ and/or $(R^1R^2R^3R^4)N^+X^-$, wherein $R^1$, $R^2$, $R^3$ and $R^4$ are the same or different and wherein each independently represents a substituted or unsubstituted, saturated or unsaturated alkyl group, a substituted or unsubstituted, saturated or unsaturated aliphatic group, a substituted or unsubstituted alicyclic hydrocarbon group, a substituted or unsubstituted aromatic group, a substituted or unsubstituted heteroaromatic group, a substituted or unsubstituted hyperbranched polymer group, a substituted or unsubstituted dendrimeric group or $R^1$, $R^2$, $R^3$ and $R^4$ each independently represents the necessary atoms to form a ring system with one another and wherein $X^-$ represents one of F, Cl, Br and I. Preferred amounts of those salts, when present in said viscous oil, said polymer host and/or said solvent-based coating layer are in the range from 0.1 to 50 wt %, more preferably in the range from 0.5 to 30 wt % and still more preferably in the range from 1 to 15 wt %.

A device according to the present invention is, for selected applicatons, further selected from the group consisting of a scanner, a digitizer, a display and a photosensitive device.

According to the present invention, in one embodiment the device in form of a scanner comprises a scanning unit with filters, filtering light in desired spectral wavelength ranges, wherein a storing unit is provided in order to store scanned information in digitized form. It is clear that the digitized information can further be electronically processed and that positive images may be printed, as a representation of the stored and/or processed digital information.

So e.g. color photographic copying material, for making positive prints from a color negative image with a scanning or analogue copier advantageously makes use of dedicated cyan couplers with specified polymer, as disclosed in DE-A's 10230977 and 10230979, and further advantageously makes use of a filter material as disclosed in the present invention.

Use of filters in a scanning device according to the present invention may proceed as described in US-Application 2002/136447, wherein a system and method for image processing proceeds by automatic color dropout, and wherein an automatic method for processing a color form includes the steps of a) scanning the color form in color space, forming a digital color image, and converting the digital color image into a two-dimensional binary image in chrominance space; and b) conducting a color form dropout process. An automatic color dropout system also includes: 1) a color detection system, including means for: (1a) scanning a color document and providing a digital image; (1b) converting the color digital image into luminance-chrominance space; (1c) detecting a background gray level, and assigning it to a "background value"; (1d) measuring color distribution; (1e) detecting the colors present; (1f) generating a color dropout table for each color; and 2) a color dropout system, including means for: (2a) scanning a color form document and providing a digital image; (2b) converting the digital image into luminance-chrominance space; (2c/d) storing and accessing the color dropout table; (2e) applying a color dropout map to the digital image; and (2f) replacing a pixel value with the "background value".

A digital image with improved performance characteristics is e.g. formed by producing a photographic image of a scene; producing a digitized electronic image of the same scene; scanning the photographic image to produce a digitized photographic image of a scene; and combining and processing the digitized electronic image and the digitized photographic image to produce another digitized image with improved performance characteristics as in U.S. Pat. No. 6,014,165. Just as in that method, producing a digital image with improved performance characteristics comprises the steps of:
a) capturing a photographic image of a scene;
b) digitizing the captured photographic image to produce a digitized photographic image;
c) simultaneously with capturing the photographic image, capturing a digitized electronic image of the scene;
d) globally aligning the digitized electronic image and the digitized photographic image; and
e) locally aligning the digitized electronic image and the digitized photographic image such that when there is any misalignment in any local area, measuring and correcting for each of these locally misaligned areas of the digitized electronic and photographic images and combining the appropriately corrected images to produce a combined digital image with improved performance characteristics. The combining and processing step includes high-pass filtering of whichever of the digitized electronic image and the digitized photographic image contains more information at high spatial frequencies, and combining the images by adding this high-pass filtered image to whichever image contains less information at high spatial frequencies. In such a method, the device suitable for use may also be provided with a filter according to the present invention.

With respect to scanning devices as for photographic multilayer color elements having at least two color records, said multilayer color elements typically contain dye image-forming units (or color records) sensitive to each of the three primary regions of the visible spectrum. Each unit can be comprised of a single emulsion layer or multiple emulsion layers sensitive to a given region of the spectrum. The layers of the element can be arranged in any of the various orders known in the art. In an alternative format, the emulsions sensitive to each of the three primary regions of the spectrum can be disposed as a single segmented layer. The elements can also contain other conventional layers such as filter layers, interlayers, subbing layers, overcoats and other layers readily apparent to one skilled in the art. A magnetic backing can be used as well as conventional supports. Preferably, transparent supports are employed in the films as are well known in the art.

The term "density representative digital signals" refers to the electronic record produced by scanning a photographic image point-by-point, line-by-line, or frame-by-frame, and measuring the -log (transmission) of light beams, that is blue, green and red scanning beams that are modulated by the yellow, magenta and cyan dyes in the film negative. In a variant color scanning approach, the blue, green and red scanning beams are combined into a single white scanning beam that is modulated by the dyes, and is read through red, green and blue filters to create three separate digital records. Scanning can be carried out by making use of any conventional scanning device. So after a color negative film has been chemically processed, it can be scanned to create a digital representation of the image. The most common approach to scanning an image is to record the transmission of a light beam, point-by-point or line-by-line. In color photography, blue, green and red scanning beams are modulated by the yellow, magenta and cyan image dyes, respectively. In a variant color scanning approach, the blue, green and red scanning beams are combined into a single white scanning beam modulated by the image dyes that is read through blue, green and red filters to create separate color records. These records can then be read into any convenient memory medium (for example, an optical disk). Systems in which the image is passed through an intermediate device, such as a scanner or computer, are often referred to as "hybrid" imaging systems. Such device advantageously makes use of a filter material according to the present invention, where appropriate in order to attenuate light in the wavelength range above 600 nm. As in U.S. Pat. No. 6,664,034 a method of developing a latent image on a photographic element (such as an imagewise exposed photographic film) proceeds by absorbing a dye precursor into the film, applying a developer solution to the film to develop the latent image and form a dye in the film, scanning the film with light, and detecting at least one of light reflected away from and light transmitted through the film. The negative, or the corresponding positive image, may also be digitized using a conventional electronic scanner to produce a digital representation of the image. Scanning of negative images on film is typically accomplished by passing visible light through the developed negative. Light transmitted through the film is attenuated by developed silver (black and white film) or by the dye layers (color film), thereby allowing one to capture and record a digital representation of the image. The transmitted light is then passed through filters, wherein a filter material according to the present invention is useful as having appropriate spectral sensitivities such that the densities of the yellow, magenta and cyan dyes may be detected for each location on the film. The density values detected in this way are indirect measures of the blue, green and red light that initially exposed each location on the film. These measured density values constitute three values used as the blue, green and red values for each corresponding location, or pixel, in the digital image. Further processing of these pixel values is often performed to produce a digital image that accurately reproduces the original scene and is pleasing to the human eye.

As in U.S. Pat. No. 6,705,777 a scanning system illuminates the coated film with light having at least one frequency within the visible portion of the electromagnetic spectrum. The light interacts with the silver and at least one dye image within the film. The scanning station measures the light from the film and produces sensor data that is communicated to a data processing system. The data processing system processes the sensor data to produce a digital image. The digital image can then be output to an output device, such as a printer, a monitor, and a memory device, without however being limited thereto. The light source thereof may comprise one or more devices or a system that produces suitable light, wherein in a preferred embodiment, the light source comprises an array of light-emitting diodes, used to produce different colors, including infrared light. In particular, specific colors of LEDs can be controlled to produce short duration light pulses of different colors. In another embodiment, the light source comprises a broad spectrum light source, such as a fluorescent, incandescent, tungsten-halogen and direct gas discharge lamps, without however being limited thereto. In such an embodiment, the sensor system may include filters as in the present invention for spectrally separating the colors of light from the film. So e.g. a RGB filtered trilinear array of detectors may be used to spectrally separate the light from the film and in another embodiment of a broad-spectrum light source, the light source includes a filter, as in the present invention, to produce the specified colors of light as envisaged. In yet another embodiment, the light source comprises a point light source: a laser as e.g. a gallium arsenide or an indium gallium phosphide laser, wherein the width of the laser beam is preferably the same size as a pixel on the film, i.a. in the range of about 12 µm. Filters as used in devices according to the present invention or other suitable wavelength modifiers or limiters may be used to provide the specified color or colors of light. Optional optics for the lighting system may direct the light to the film: the optics may comprise a waveguide that directs the light onto the film. In other embodiment the optics may include a lens system for focusing the light. Such a lens system may include a polarizing filter to condition the light. The optics may also include a light baffle, wherein the light baffle constrains illumination of the light within a scan area in order to reduce light leakage that could cause fogging of the film. The light baffle advantageously comprises a coated member adjacent the film and is generally a light absorbing material, preventing reflecting light that could cause fogging of the film. The detecting system comprises one or more photodetectors that convert light from the film into data signals and may comprise a linear charge coupled device (CCD) array or an area array and may also comprise a photodiode, a phototransistor and/or a photoresistor, and the like. In order to limit the bandwith or color, detected by individual photodetectors, the detector advantageously includes filters, and filters according to the present invention may be useful therein. So a trilinear array often includes separate lines of photodetectors with each line of photodetectors having a color filter to allow only one color of light to be measured by the photodetector. Specifically, in a trilinear array, the array generally includes individual red, green, and blue filters over separate lines in the array as this allows the simultaneous measurement of red, green, and blue components of the light. Other suitable types of filters are e.g. a hot mirror and a cold mirror which can be used to separate infrared light from visible light, but with respect to the present invention, the new filters presented herein are preferred. Different architectures and embodiments of the scanning station may scan the film differently: so the lighting system and sensor system operates in concert to illuminate and sense the light from the film in order to produce suitable sensor data. In one embodiment, the lighting system separately applies distinct colors of light to the film: the sensor system then generally comprises a non-filtered detector that measures in series the corresponding colors of light from the film. In another embodiment, multiple unique color combinations are simultaneously applied to the film, and individual color records are derived from the sensor data. In another embodiment, the lighting system simultaneously applies multiple colors of light to the film: the sensor system then generally comprises a filtered detector that allows the simultaneous measurement of individual colors of light. Other suitable scanning methods may be used to obtain the required color records.

A digitizer as a particular device according to the present invention comprises, in one embodiment thereof, a stimulation radiation laser source for stimulation of stored energy in an X-ray exposed stimulable phosphor panel inserted therein, wherein a colored filter is installed between stimulating laser source and phosphor panel in order to provide spectrally pure stimulation.

In a preferred embodiment according to the present invention said digitizer is additionally provided with colored glass filters, selected from the group of Schott® filters of the type OG590, RG610, RG630, RG645, RG665, KG1, KG2, KG3, KG4 and KG5.

A digitizer according to the present invention, in one embodiment thereof, has an optical filter, installed between filtering means and detecting means in order to provide absorption of infrared fluorescence of said organophosphonium transition metal dye.

A digitizer according to the present invention, in another embodiment thereof, has an optical filter, installed between the storage phosphor panel and filtering means in order to reduce the excitation of infrared fluorescence of said organophosphonium transition metal dye by stimulation light reflected by the phosphor panel.

A digitizer according to the present invention, in a further embodiment, is provided with transducer elements arranged for detecting light emitted upon stimulation, wherein said transducer elements are CCD's A display according to the present invention, in a particular embodiment, includes a light source, wherein the filter material is positioned in order to receive light from said light source.

In a preferred embodiment said light source in a display according to the present invention, comprises a plurality of light-emitting diodes.

In another embodiment of the display as a device according to the present invention at least one of said plurality of light-emitting diodes is coated with dye-based filter material.

Furtheron, in still another embodiment of the display according to the present invention, at least one of said plurality of light-emitting diodes has a lens formed with the filter material mixed with a polymer host material.

It is clear that such a display, provided with a dye-based filter material provides night vision imaging system filtering. In another embodiment an avionic display system is envisaged, wherein said system is provided with a display configured to provide visual images in the visual frequency range; and a dye-based filter material positioned to receive light associated with visual images and wherein the dye-based filter material attenuates light in the near-infrared and infrared range. The light source of said avionic system advantageously includes light emitting diodes and the dye-based filter material is further advantageously coated with such light emitting diodes. In the avionic display system the dye-based filter material thus is a cobalt or nickel dye material, wherein said filter material attenuates light at wavelengths above 750 nm. With respect to the manufacturing of the display, the method advantageously comprises the steps of (1) providing a light source; (2) coating the light source with a film that receives light from the light source with a dye-based filter material, wherein the dye-based filter material attenuates light in the infrared range. The said method further comprises the step of providing an overcoat to the dye material in order to seal it from the environment.

The light source preferably is an array of light-emitting diodes, wherein at least one of the light-emitting diodes is coated. Advantageously the dye-based filter material includes a polymer host doped with combinations of at least one of the particularly suitable organophosphonium cobalt and/or nickel dyes.

The display system, in another embodiment, comprises means for providing a visual image; and means for filtering light to absorb the light associated with the visual image above a selected wavelenght range, wherein the selected wavelength range is above 610 nm. In a preferred embodiment a night vision imaging system filter comprises a monomer or polymer host; and a dye, wherein the host is doped with the dye and wherein the filter absorbs light in the near-infrared and infrared range and allows light in the visible range to pass. The filter provides attenuation of light between a wavelenght of 640 to 740 nm to a level of less than 10%. In a further preferred embodiment the filter comprises a pair of translucent films, wherein at least one of the translucent films are polarized. Advantageously a blocking filter further provides attentuation in the range from 745 nm to 1000 nm.

A scanner as a device according to the present invention, comprises a scanning unit, provided with filters, filtering light in desired spectral wavelength ranges (e.g. blue, green and red as for color negative images) and a storing unit in order to store scanned information in digitized form.

A particular digitizer as a device according to the present invention provides ability for reading out stimulable phosphor screens, plates or panels having been exposed to X-rays, wherein said system comprises at least one source of stimulating radiation, an array of transducer elements arranged for detecting light emitted upon stimulation and for converting said light into a signal representation of said image, and filtering means for preventing light emitted by said source of stimulation light from being detected by said transducer elements, characterized in that a ratio of transmission at the stimulating emission wavelength of said source of stimulation light and transmission of stimulated light in the wavelength range between 350 nm and 500 nm is less than $10^{-6}$, wherein said ratio is defined by the formula (II):

$$Tr(\lambda_{st}(nm))/Tr(\lambda_x(nm)) < 10^{-6} \quad \text{(II)}$$

wherein $\lambda_{st}$ is the stimulation wavelength
and wherein
350 nm$<\lambda_x<$500 nm In that formula (II) said transmission typically refers to one single wavelength, e.g. 660 nm, as in the case of a laser source or a semiconductor emitting light in a narrow wavelength range, as stimulable phosphor plates are typically read out with a laser or a semiconductor radiation source.

Said transducer elements for detecting light emitted upon stimulation and for converting said light into a signal representation of said image, preferably are charge-coupled devices.

In the digitizer according to the present invention transmitting light through the filter comprising the organophosphonium dyes preferably proceeds with an efficiency of more than 50%, more preferably more than 60%, and even most preferably with an efficiency of more than 75%.

A photosensitive device as a particular device according to the present invention, comprises a component sensitive in the red wavelength range exceeding 600 nm. A photosensitive device according to the present invention as a component, advantageously is a (silver halide) photographic material selected from the group consisting of a black-and-white film material, a color negative, a color positive and a color reversal film material. When a color negative or a color intermediate film is envisaged, said film comprises a transparent film support and coated thereon, in succession, a blue antihalation layer, at least one red-sensitized silver halide emulsion layer comprising at least one cyan-forming coupler, an intermediate layer, at least one green-sensitized silver halide emulsion layer comprising at least one magenta-forming coupler, a yellow filter layer, at least one blue-sensitive silver halide emulsion layer comprising at least one yellow-forming coupler, and an antistress layer, wherein said blue antihalation layer comprises at least one divalent transition metal organophosphonium dye, besides or as an alternative for the blue non-diffusing dye or dyes, known from EP-A 0 582 000.

In another embodiment wherein a color photographic motion picture projection film element or a printing paper is envisaged, on a support is coated, in succession, a blue-sensitive silver halide emulsion layer comprising a yellow-forming coupler, a red-sensitized silver halide emulsion layer comprising a cyan-forming coupler, an intermediate layer, a green-sensitized silver halide emulsion layer comprising a magenta-forming coupler, and an antistress layer, wherein between said support and said blue-sensitive silver halide emulsion layer a yellow antihalation undercoat is provided, which comprises at least one yellow non-diffusing dye that absorbs blue light and is removable and/or decolorizable in a processing bath and that between said blue-sensitive silver halide emulsion layer and said red-sensitized silver halide emulsion layer a bluish antihalation intermediate layer is provided, which comprises at least one divalent transition metal organophosphonium dye, besides or as an alternative for the blue non-diffusing dye or dyes, known from EP-A 0 252 550.

In the embodiment wherein a device according to the present invention is provided with a filter, said filter is advantageously further provided with at least one dielectric filter layer. The said filter material of the present invention therein advantageously comprises a polymer host and at least one organophosphonium cobalt or nickel dye or a mixture thereof. The dye further preferably has a melting point of no more than a temperature well below room temperature. It is advantageous that said filter material is or is made non-luminescent. The filter material, in a particular embodiment thereof, comprises a polymer host and a, preferably non-luminescent, dye material. Besides organo-phosphonium transition metal dyes, organoammonium transition metal dyes, disclosed in a copending application related with a system for reading out storage phosphor screens, may be used in a mixture. In another particular embodiment, besides organophosphonium transition metal dyes, mixed type dyes as e.g. those having organoammonium and organophosphonium parts besides the divalent transition metal complex, may moreover be present. The dyes particularly suitable for use in a device, and more in particular in a filter material of such device according to the present invention can be prepared according to synthetic methods known to those who are skilled in the art of organic synthesis.

A detailed description is given in the section "Examples, I. Dye Synthesis."

More information can also be found in references such as Transition Metal Chemistry (London), 1997, 22(2), 117-122 and the references mentioned above.

Examples of preferred dyes according to general formula (I), however not limited to these examples, are given in Table 1.

TABLE 1

Organophosphonium dyes according to general formula (I), wherein for the tabulated dyes: n = 1; Σ(+) = 1; m = 2 being $P^+R^1R^2R^3R^4$ and $P^+R^5R^6R^7R^8$ and wherein the divalent transition metal ion is $Co^{2+}$.

| Dye | $R^1 = R^5$ | $R^2 = R^6$ | $R^3 = R^7$ | $R^4 = R^8$ | $X^1$ | $X^2$ | $X^3$ | $X^4$ |
|---|---|---|---|---|---|---|---|---|
| 1 | Butyl | Butyl | Butyl | Benzyl | Cl | Cl | Cl | Cl |
| 2 | Butyl | Butyl | Butyl | Cetyl | Cl | Cl | Br | Br |
| 3 | Butyl | Butyl | Butyl | Octadecyl | Cl | Cl | Cl | Cl |
| 4 | Methyl | Octyl | Octyl | Octyl | Br | Br | Br | Br |
| 5 | Methyl | Octyl | Octyl | Octyl | Cl | Cl | Cl | Cl |
| 6 | Butyl | Butyl | Butyl | Benzyl | Br | Br | Br | Br |
| 7 | Butyl | Butyl | Butyl | Cetyl | Cl | Cl | Cl | Cl |
| 8 | Butyl | Butyl | Butyl | Cetyl | Br | Br | Br | Br |
| 9 | Butyl | Butyl | Butyl | Cetyl | Cl | Cl | Br | Cl |
| 10 | Butyl | Butyl | Butyl | Cetyl | Cl | Cl | Br | I |
| 11 | Phenyl | Phenyl | Phenyl | Cetyl | Cl | Cl | Br | Cl |
| 12 | Phenyl | Phenyl | Phenyl | Methyl | Cl | Cl | Cl | Cl |
| 13 | Methyl | Methyl | Methyl | Cetyl | Br | Br | Br | Br |
| 14 | Phenyl | Phenyl | Phenyl | Benzyl | Cl | Cl | Cl | Cl |
| 15 | Phenyl | Phenyl | Phenyl | 2-hydroxyethyl | Br | Br | Br | Br |
| 16 | Phenyl | Phenyl | Phenyl | 2-hydroxyethyl | Cl | Cl | Cl | Cl |
| 17 | Phenyl | Phenyl | Phenyl | 2-hydroxyethyl | Cl | Cl | Br | Br |
| 18 | Phenyl | Phenyl | Phenyl | CH2CH2CO2H | Cl | Cl | Cl | Cl |
| 19 | Phenyl | Phenyl | Phenyl | CH2CH2CO2Et | Cl | Cl | Cl | Cl |
| 20 | Butyl | Butyl | Butyl | CH2CH2CO2H | Cl | Cl | Cl | Cl |
| 21 | Butyl | Butyl | Butyl | CH2CH2CO2Et | Cl | Cl | Cl | Cl |
| 22 | Butyl | Butyl | Butyl | 3-trimethoxy silylpropyl | Cl | Cl | Cl | Cl |
| 23 | Butyl | Butyl | Butyl | 3-trimethoxy silylpropyl | Br | Br | Br | Br |
| 24 | Butyl | Butyl | Butyl | 3-trimethoxy silylpropyl | Cl | Cl | Br | I |

TABLE 1-continued

Organophosphonium dyes according to general formula (I),
wherein for the tabulated dyes:
$n = 1$; $\Sigma(+) = 1$; $m = 2$ being $P^+R^1R^2R^3R^4$ and
$P^+R^5R^6R^7R^8$ and wherein the divalent transition metal ion is $Co^{2+}$.

| Dye | $R^1 = R^5$ | $R^2 = R^6$ | $R^3 = R^7$ | $R^4 = R^8$ | $X^1$ | $X^2$ | $X^3$ | $X^4$ |
|---|---|---|---|---|---|---|---|---|
| 25 | Octyl | Octyl | Octyl | CH2CH2CO2H | Cl | Cl | Cl | Cl |
| 26 | Propyl | Propyl | Propyl | Cetyl | Br | Cl | Cl | Cl |
| 27 | Ethyl | Ethyl | Ethyl | Cetyl | Cl | Cl | Cl | Cl |
| 28 | Ethyl | Ethyl | Ethyl | Cetyl | Br | Br | Br | Br |
| 29 | i-butyl | i-butyl | i-butyl | Cetyl | Br | Cl | Cl | I |
| 30 | Benzyl | Benzyl | Benzyl | Cetyl | Br | Cl | Cl | I |

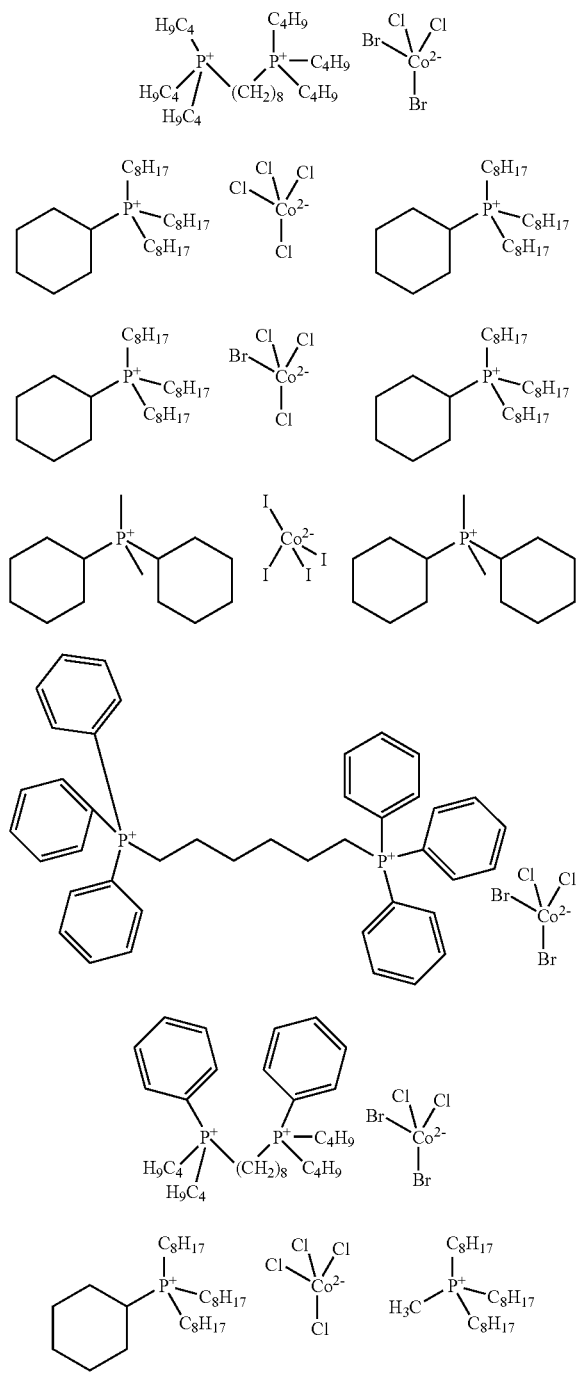

TABLE 1-continued

Organophosphonium dyes according to general formula (I),
wherein for the tabulated dyes:
n = 1; Σ(+) = 1; m = 2 being $P^+R^1R^2R^3R^4$ and
$P^+R^5R^6R^7R^8$ and wherein the divalent transition metal ion is $Co^{2+}$.

| Dye | $R^1 = R^5$ | $R^2 = R^6$ | $R^3 = R^7$ | $R^4 = R^8$ | $X^1$ | $X^2$ | $X^3$ | $X^4$ |
|---|---|---|---|---|---|---|---|---|

TABLE 1-continued

Organophosphonium dyes according to general formula (I),
wherein for the tabulated dyes:
n = 1; Σ(+) = 1; m = 2 being $P^+R^1R^2R^3R^4$ and
$P^+R^5R^6R^7R^8$ and wherein the divalent transition metal ion is $Co^{2+}$.

| Dye | $R^1 = R^5$ | $R^2 = R^6$ | $R^3 = R^7$ | $R^4 = R^8$ | $X^1$ | $X^2$ | $X^3$ | $X^4$ |
|-----|-------------|-------------|-------------|-------------|-------|-------|-------|-------|

TABLE 1-continued
Organophosphonium dyes according to general formula (I),
wherein for the tabulated dyes:
n = 1; Σ(+) = 1; m = 2 being $P^+R^1R^2R^3R^4$ and
$P^+R^5R^6R^7R^8$ and wherein the divalent transition metal ion is $Co^{2+}$.
| Dye | $R^1 = R^5$ | $R^2 = R^6$ | $R^3 = R^7$ | $R^4 = R^8$ | $X^1$ | $X^2$ | $X^3$ | $X^4$ |
|---|---|---|---|---|---|---|---|---|
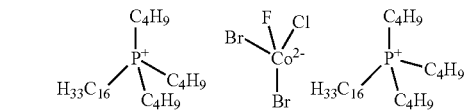
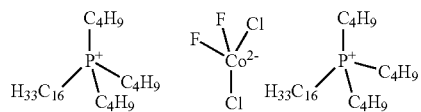
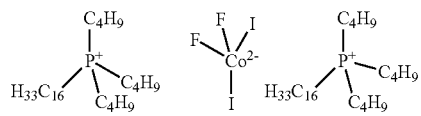
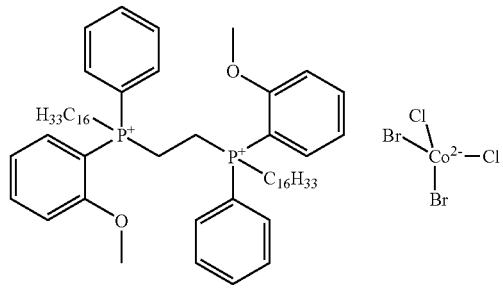
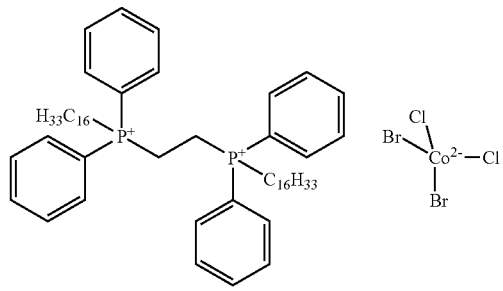
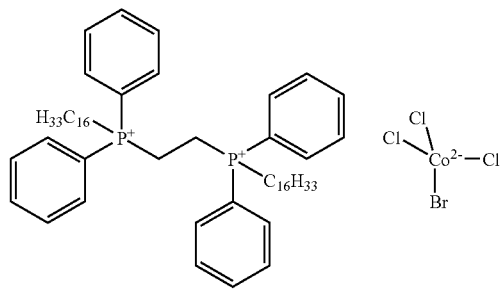

TABLE 1-continued

Organophosphonium dyes according to general formula (I),
wherein for the tabulated dyes:
n = 1; Σ(+) = 1; m = 2 being P⁺R¹R²R³R⁴ and
P⁺R⁵R⁶R⁷R⁸ and wherein the divalent transition metal ion is Co²⁺.

| Dye | R¹ = R⁵ | R² = R⁶ | R³ = R⁷ | R⁴ = R⁸ | X¹ | X² | X³ | X⁴ |
|-----|---------|---------|---------|---------|----|----|----|----|

The transmission spectra of the dyes suitable for use in a filter of a device according to the present invention can be fine-tuned by changing both the ligands on the Co-ion or Ni-ion, as well as the structure of the phosphonium counterions.

Although filters wherein those dyes are incorporated provide a high and sufficient absorption of radiation in the wavelength range between 600 nm and 800 nm, moreover providing excellent transmission of light in the wavelenght range of 300-350 nm to 500 nm, there are two important aspects to be taken into account. A first aspect is related with the "spectral purity" of the light to be absorbed: semiconductor lasers, however generating radiation to the highest extent in an extremely small wavelength range of about 10 nm, may also emit light having a wavelength of e.g. about 590 nm. Although the intensity at 590 nm is very low, the optical density of the filter may be not satisfactory at that wavelength. A solution therefore is then offered by application of two optical filters, positioned in the vicinity of the said semiconductor laser. Quite a lot of combinations are possible in order to block undesired radiation emitted by that laser. A second aspect is related with fluorescence of the selected organophosphonium cobalt or nickel dyes. Emission of fluorescent radiation has indeed been detected in the wavelength range from 700 tot 800 nm. In order to solve that problem an additional infrared filter should advantageously be installed: satisfying results were attained with commercially available filters as e.g. KG5® from Schott, and even more preferably BG39® from the same manufacturer, both having a thickness of 2 mm.

While the present invention will hereinafter be described in connection with preferred embodiments thereof, it will be understood that it is not intended to limit the invention to those embodiments.

EXAMPLES

I. Dye Synthesis.

The synthesis of organocobalt dyes according to formula (I) proceeds by way of example, however not limited to, as described for Dye 1 and Dye 2.

I.1 Synthesis of Dye 1: Bis[benzyltributylphosphonium] tetrachlorocobaltate. Dye 1 has been prepared according to Scheme 1. 11.9 g (0,05 mole) of $CoCl_2$ hexahydrate was suspended in 400 ml of ethyl acetate. The suspension was azeotropically dried while being kept under a nitrogen atmosphere. The mixture water/ethyl acetate was removed with a Dean Stark separator. The volume of ethyl acetate was kept constant at 400 ml by adding additional amounts of ethyl acetate. The more water was removed, the more the color of the suspension was changing from red to blue. The water content of the portions ethyl acetate/water removed was determined (Karl Fischer) until the theoretical amount of water was removed. After one hour under reflux a suspension of 34.5 g of benzyl tributyl phosphonium chloride in ethyl acetate (200 ml) is added and reflux was continued for three more hours. During this time two 100 ml of ethyl acetate fractions were removed by destillation. After three hours a clear, deep blue oily phase separated from the reaction mixture. The reaction mixture was cooled to 50° C. and the ethyl acetate layer was removed. Residual ethyl acetate in the oil was removed under high vacuum in the temperature range from 50° C. to 60° C. 40 g of Dye 1 were obtained as a viscous deep blue oil.

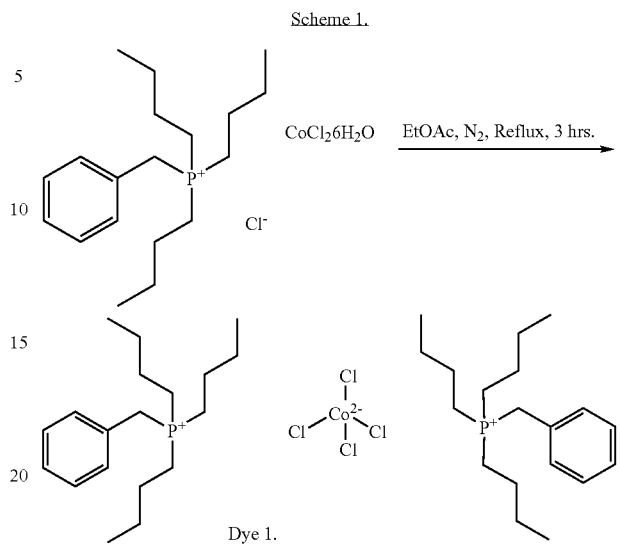

Scheme 1.

I.2 Synthesis of Dye 2: Bis[cetyltributylphosphonium] dibromo dichloro cobaltate. Dye 2 has been prepared according to Scheme 2.

11.9 g (0,05 mole) of $CoCl_2$ hexahydrate was suspended in 400 ml of ethyl acetate. The suspension was azeotropically dried while being kept under a nitrogen atmosphere. The mixture water/ethyl acetate was removed with a Dean Stark separator. The volume of ethyl acetate was kept constant at 400 ml by adding additional amounts of ethyl acetate. The more water was removed, the more the color of the suspension was changing from red to blue. The water content of the collected portions ethyl acetate/water was determined (Karl Fischer) until the theoretical amount of water was collected. After a refluxing time of two hours a solution of 53.2 g of cetyl tributyl phosphonium bromide in 200 ml of warm ethyl acetate was added. The resulting mixture was heated under reflux for two more hours while ethyl acetate was removed by destillation. A deep blue oil was obtained which is cooled to 50° C. Residual ethyl acetate in the oil was removed under high vacuum at a temperature in the range from 50° C. to 60° C. 57.8 g of Dye 2 were obtained as a deep blue oil.

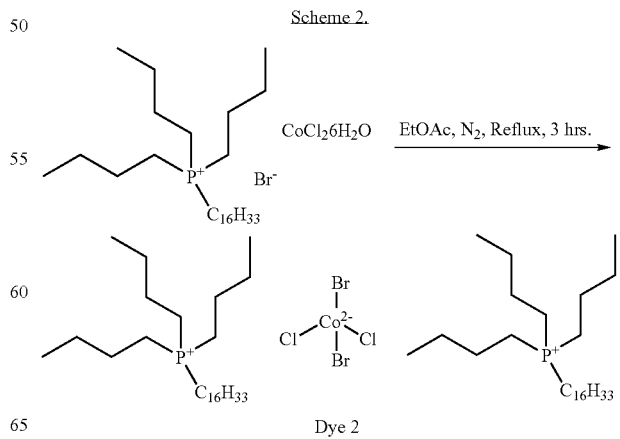

Scheme 2.

Analoguous procedures can be used in order to prepare the other dyes mentioned in Table 1.

II. Absorption and Transmission Spectra of Dye 1 and Dye 2

The Absorption Spectrum of Dye 1 and of Dye 2 (thin film between two glass slides) has been represented in FIG. 1A. It is concluded therefrom that for Dye 1 a high absorption density of at least 1.5 has been measured in the wavelength range from 660 to 705 nm.

For Dye 2 the density of 1.5 is obtained in a more bathochromic range (from 680-720 nm).

Figure 1B:
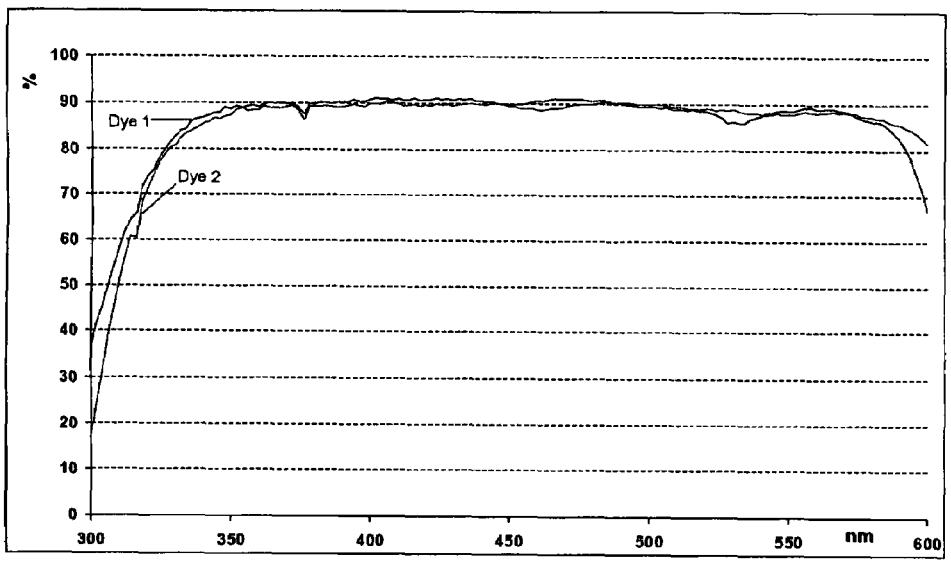

The Transmission Spectrum of Dye 1 and of Dye 2 (thin film between two glass slides) represented in FIG. 1B shows a particularly desired transmission of about 90% measured in the wavelength range from 350 to about 500 nm for both dyes.

III. Inventive filter with Dye 1 (tetrachlorocobaltate salt) or Dye 2 (dichlorodibromocobaltate salt).

A Schott BG39® filter having a thickness of 1 mm was coated with dye layers of both dyes, dye 1 and dye 2, having different thicknesses (100 μm and 150 μm thick respectively). It was not possible to detect any laser radiation passing the filter combination as set forth, when making use therefore of the "Photonic Multi-Channel Analyser PMA-11" spectrophotometer from HAMAMATSU, Japan. This result is illustrative for the suitable absorption, by a combination of Schott BG39® and tetrachloro- and dibromodichloro-cobaltate filters with a thickness of 1 mm, within a wavelength range from 700 nm to 800 nm.

Determination of the optical density was possible with the UDT radiometer S370: a power (expressed in nW) as indicated in the Table 2 hereinafter, after correction for the dark current, could still be measured for a power of the laser source of 12 mW. Optical densities measured were also summarized in the Table hereinafter.

TABLE 2

| Filter combination | Power measured after transmission (nW) | Optical Density |
| --- | --- | --- |
| BG39 ® _1 mm + dye 1_100 μm | 2.4 | 6.70 |
| BG39 ® _1 mm + dye 1_150 μm | 0.24 | 7.70 |
| BG39 ® _1 mm + dye 2_100 μm | 18.0 | 5.82 |
| BG39 ® _1 mm + dye 2_150 μm | 0.41 | 7.47 |

From Table 2 it becomes clear that for both dye filters there is a remarkably reduced power measured after transmission of the 150 μm dye layers and a comparable high optical density.

Having described in detail preferred embodiments of the current invention, it will now be apparent to those skilled in the art that numerous modifications can be made therein without departing from the scope of the invention as defined in the appending claims.

What is claimed is:

1. A device comprising at least one organophosphonium divalent transition metal dye wherein said organophosphonium transition metal dye is an organophosphonium compound according to the general formula (I)

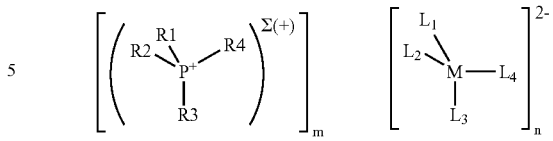

wherein M is Co or Ni,
wherein $n \geq 1$, $m \geq 1$, $\Sigma(+) \geq 1$, and
wherein $-2n = m\Sigma(+)$, and
wherein $R^1$, $R^2$, $R^3$ and $R^4$ are the same or different and each represent an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another, and
wherein $L^1$, $L^2$, $L^3$ and $L^4$ each independently represents one of F, Cl, Br and I, and
when m=1, then $\Sigma(+) = 2n$ and consequently 2n positively charged centers are present in the phosphonium cation, and
when n=1 and $\Sigma(+)=1$, then m=2 and consequently two phosphonium cations $(P^+R^1R^2R^3R^4)$ and $(P^+R^5R^6R^7R^8)$ are present in the molecule, wherein $R^5$, $R^6$, $R^7$, $R^8$ are the same or different and each represents an alkyl group, an aliphatic group, an alicyclic hydrocarbon group, an aromatic group, a heteroaromatic group, a hyperbranched polymer group, a dendrimeric group or $R^5$, $R^6$, $R^7$ and $R^8$ each independently represents the necessary atoms to form a ring system with one another wherein said device is selected from the group consisting of a scanner, a digitizer, a display and a photosensitive device.

2. A device according to claim 1, wherein said device comprises a filter or filter layer, provided with at least one organophosphonium divalent transition metal dye.

3. A device according to claim 1, wherein said transition metal in said organophosphonium transition metal dye is divalent cobalt or nickel.

4. A device according to claim 2, wherein said transition metal in said organophosphonium transition metal dye is divalent cobalt or nickel.

5. A device according to claim 2, wherein said organophosphonium transition metal dye is an organophosphonium compound according to the general formula (I)

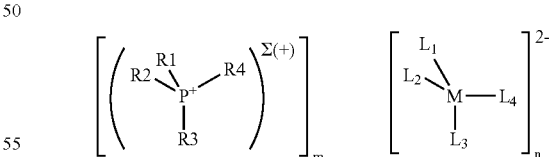

wherein M is Co or Ni,
wherein $n \geq 1$, $m \geq 1$, $\Sigma(+) \geq 1$, and
wherein $-2n = m\Sigma(+)$, and
wherein $R^1$, $R^2$, $R^3$ and $R^4$ are the same or different and each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another, and wherein $L^1$, $L^2$, $L^3$ and $L^4$ each independently represents one of F, Cl, Br and I, and when m=1, then $\Sigma(+)=2n$ and consequently 2n positively charged centers are present in the phosphonium cation, and when n=1 and $\Sigma(+)=1$, then m=2 and consequently two phosphonium cations $(P^+R^1R^2R^3R^4)$ and $(P^+R^5R^6R^7R^8)$ are present in the molecule, wherein $R^5$, $R^6$, $R^7$, $R^8$ are the same or different and each independently represents an alkyl group, an aliphatic group, an alicyclic hydrocarbon group, an aromatic group, a heteroaromatic group, a hyperbranched polymer group, a dendrimeric group or $R^5$, $R^6$, $R^7$ and $R^8$ each independently represents the necessary atoms to form a ring system with one another.

6. A device according to claim 1, wherein said device is a layered material, wherein in at least one layer thereof at least one organophosphonium transition metal dye is present according to the general formula (I)

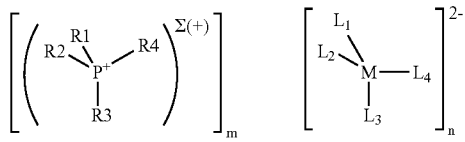

wherein M is Co or Ni,
wherein $n \geq 1$, $m \geq 1$, $\Sigma(+) \geq 1$, and
wherein $-2n = m\Sigma(+)$, and
wherein $R^1$, $R^2$, $R^3$ and $R^4$ are the same or different and each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another, and wherein $L^1$, $L^2$, $L^3$ and $L^4$ each independently represents one of F, Cl, Br and I, and when m=1, then $\Sigma(+)=2n$ and consequently 2n positively charged centers are present in the phosphonium cation, and when n=1, and $\Sigma(+)=1$, then m=2 and consequently two phosphonium cations $(P^+R^1R^2R^3R^4)$ and $(P^{+5}R^6R^7R^8)$ are present in the molecule, wherein $R^5$, $R^6$, $R^7$, $R^8$ are the same or different and each independently represents an alkyl group, an aliphatic group, an alicyclic hydrocarbon group, an aromatic group, a heteroaromatic group, a hyperbranched polymer group, a dendrimeric group or $R^5$, $R^6$, $R^7$ and $R^8$ each independently represents the necessary atoms to form a ring system with one another.

7. A device according to claim 2, wherein said device is a layered material, wherein in at least one layer thereof at least one organophosphonium transition metal dye is present according to the general formula (I)

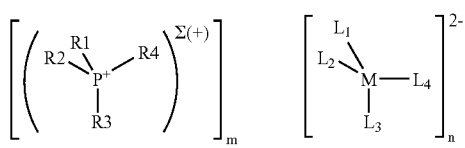

wherein M is Co or Ni,
wherein $n \geq 1$, $m \geq 1$, $\Sigma(+) \geq 1$, and
wherein $-2n = m\Sigma(+)$, and
wherein $R^1$, $R^2$, $R^3$ and $R^4$ are the same or different and each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another, and wherein $L^1$, $L^2$, $L^3$ and $L^4$ each independently represents one of F, Cl, Br and I, and when m=1, then $\Sigma(+)=2n$ and consequently 2n positively charged centers are present in the phosphonium cation, and when n=1 and $\Sigma(+)=1$, then m=2 and consequently two phosphonium cations $(P^+R^1R^2R^3R^4)$ and $(P^+R^5R^6R^7R^8)$ are present in the molecule, wherein $R^5$, $R^6$, $R^7$, $R^8$ are the same or different and each independently represents an alkyl group, an aliphatic group, an alicyclic hydrocarbon group, an aromatic group, a heteroaromatic group, a hyperbranched polymer group, a dendrimeric group or $R^5$, $R^6$, $R^7$ and $R^8$ each independently represents the necessary atoms to form a ring system with one another.

8. A device according to claim 1, wherein said organophosphonium dye is present as a viscous deep blue oil.

9. A device according to claim 8, wherein said viscous deep blue oil is applied between colored or non-colored glass plates or plastic foils.

10. A device according to claim 8, wherein said organophosphonium dye is embedded in a polymer host.

11. A device according to claim 9, wherein said organophosphonium dye is embedded in a polymer host.

12. A device according to claim 10, wherein said polymer host is a UV-cured or a thermally cured matrix.

13. A device according to claim 11, wherein said polymer host is a UV-cured or a thermally cured matrix.

14. A device according to claim 12, wherein said UV-cured matrix is generated from a UV-curable composition, comprising monomers, oligomers or mixtures thereof, photoinitiators and/or synergists.

15. A device according to claim 13, wherein said UV-cured matrix is generated from a UV-curable composition, comprising monomers, oligomers or mixtures thereof, photoinitiators and/or synergists.

16. A device according to claim 8, wherein said viscous deep blue oil is present in a solvent-based coating.

17. A device according to claim 2, wherein said filter is further provided with at least one dielectric filter layer.

18. A device according to claim 8, wherein said viscous oil further comprises a compound according to the formula

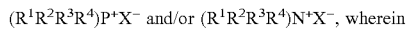

$R^1$, $R^2$, $R^3$ and $R^4$ are the same or different and each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another and wherein $X^-$ represents one of F, Cl, Br and I.

19. A device according to claim 10, wherein said polymer host further comprises a compound according to the formula

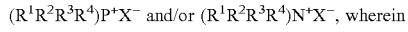

$R^1$, $R^2$, $R^3$ and $R^4$ are the same or different and each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another and wherein $X^-$ represents one of F, Cl, Br and I.

20. A device according to claim 16, wherein said solvent-based coating further comprises a compound according to the formula

$(R^1R^2R^3R^4)P^+X^-$ and/or $(R^1R^2R^3R^4)N^+X^-$, wherein $R^1$, $R^2$, $R^3$ and $R^4$ are the same or different and each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another and wherein $X^-$ represents one of F, Cl, Br and I.

* * * * *